United States Patent Office 2,718,515
Patented Sept. 20, 1955

2,718,515

COPOLYMERS OF N-SUBSTITUTED ACRYLAMIDES

Walter M. Thomas, Noroton Heights, Conn., assignor to American Cyanamid Company, New York, N. Y., a corporation of Maine No Drawing. Application August 13, 1954,
Serial No. 449,797

11 Claims. (Cl. 260—80.5)

This invention relates to the production of new materials having valuable and characteristic properties that make them especially suitable for use in industry, for example in the production of fibers, in adhesive compositions, as components of surface-coating and laminating compositions, and for various other purposes. More particularly the invention is concerned with products comprising a copolymer obtained by polymerization of a mixture of copolymerizable ingredients including (1) an N-substituted acrylamide represented by the general formula:

I

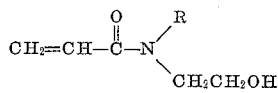

where R represents a member of the class consisting of hydrogen, the methyl radical and the radical

and (2) at least one monomer of the class consisting of styrene, acrylonitrile and alkyl acrylates containing from one to five carbon atoms, inclusive, in the alkyl grouping thereof, the N-substituted acrylamide of (1) constituting from about 5% to about 40% by weight of the total amount of (1) and (2). When R in Formula I represents hydrogen the compound is N-(2-hydroxyethyl)acrylamide; when R represents the radical

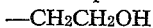

the compound is N,N-bis(2-hydroxyethyl)acrylamide, the formula for which is:

II

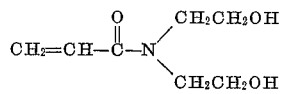

The N-substituted acrylamides used in practicing the present invention are known compounds, as also are the homopolymers thereof. (See, for example, U. S. Patent No. 2,508,717 which also describes the preparation of homopolymers of such N-substituted acrylamides.) However, to the best of my knowledge and belief, it was not known or suggested that new and valuable copolymer compositions could be produced by copolymerization of copoylmerizable ingredients including an N-substituted acrylamide of the kind embraced by Formula I and styrene, acrylonitrile or an alkyl acrylate containing from one to five carbon atoms, inclusive, in the alkyl grouping thereof, that is, methyl to amyl acrylates, inclusive, or mixtures of any or all of such monomers in any proportions, and wherein the N-substituted acrylamide constitutes from about 5% to about 40%, more particularly from about 5 or 10% to about 20 or 30% by weight of the total amount on N-substituted acrylamide and styrene, acrylonitrile or alkyl acrylate of the kind just mentioned, or mixtures thereof in any proportions. By using these particular comonomers in the particular range of proportions given hereinbefore, copolymers are produced that have characteristic and valuable properties. In general, the N-substituted acrylamide imparts hydrophilic characteristics, or in some cases even water-solubility, to the copolymer. In addition, it provides reactive primary hydroxyl groups in the copolymer molecule, thereby rendering the copolymer more amenable to subsequent chemical treatments. When the copolymers are used as components of, for example, coating and laminating compositions, the hydroxyl groups present therein render them more compatible with, for instance, aminoplast resins (e. g., urea-formaldehyde and melamine-formaldehyde resins), which also are commonly used as components of such compositions. In the case of fiber-forming copolymers, specifically copolymers of acrylonitrile and the N-substituted acrylamide, the primary hydroxyl groups contained therein are instrumental in rendering the fiber more hydrophilic, more readily dyed and/or more receptive to various after-treatments as compared with a fiber formed from, for instance, a homopolymer of acrylonitrile.

It is a primary object of the present invention to prepare a new class of copolymers or interpolymers for use in industry.

Another object of the invention is to improve the usefulness of N-(2-hydroxyethyl)acrylamide, N,N-bis(2-hydroxyethyl)acrylamide and N-methyl-N-(2-hydroxyethyl)acrylamide, whereby their field of utility is enhanced.

Another object of the invention is the production of new acrylonitrile copolymer compositions which are more readily both fabricated (e. g., in fiber or other form) and dyed than homopolymeric acrylonitrile and copolymers of acrylonitrile such as those suggested in the prior art.

Other objects of the invention will be apparent to those skilled in the art from the description and examples which follow.

The foregoing objects are attained by copolymerization of a mixture of copolymerizable monomers including an N-substituted acrylamide of the kind embraced by Formula I and styrene, acrylonitrile, methyl acrylate, ethyl acrylate, propyl acrylate, isopropyl acrylate, normal or isomeric butyl acrylates or normal or isomeric amyl acrylates (or mixtures thereof in any proportions) in percentages thereof, by weight, ranging from about 5% to about 40% of the N-substituted acrylamide to from about 95% to about 60% of the styrene, acrylonitrile or alkyl acrylate (or a mixture thereof in any proportions). Heat, light, or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light, or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-compounds, examples of which are given hereinafter. Other so-called "free radical" types of catalysts, e. g., α,α'-azodiisobutyronitrile, also can be used to accelerate polymerization. The various known "redox" (reduction-oxidation) catalyst systems also can be employed, and are especially adapted for use when the mixed monomers are copolymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e. g., the water-soluble peroxides, peracids and persalts, including hydrogen peroxide, organic peroxides, e. g., diacetyl peroxide, urea peroxide, etc., peracetic acid, the various water-soluble perchlorates, persulfates, percarbonates, perborates, perphospates, etc., e. g., the ammonium and alkali-metal (sodium, potassium, lithium, etc.) salts of percarbonic, peracetic, perboric, perphosphoric, persulfuric, perchloric, etc., acids; and water-soluble ferric salts capable of yielding ferric ions, including the various ferric alums, e. g., ferric ammonium sulfate (ferric ammonium alum), ferric sodium sulfate, ferric potassium sulfate, etc. Other examples of water-soluble additives comprising a water-soluble catalyst that may be used in producing the copolymers of the present invention are given in, for instance, U. S. Patents 2,289,540, 2,380,474, −5, −6, −7, 2,380,617, −8, 2,380,710, 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e. g., sodium, potassium, etc.) bisulfites, hydrosulfites, thiosulfates, sulfurous acid (or compounds which engender sulfurous acid, e. g., alkali-metal sulfites, ethyl and other alkyl sulfites, etc.), various organic sulfinic acids, e. g., p-toluene sulfinic acid, formamidine sulfinic acid, etc. If alkali-metal sulfites, e. g., sodium sulfite, or similar compounds which engender sulfurous acid are used, the aqueous solution also should contain a strong acid, e. g., sulfuric acid, etc., in an amount which is at least chemically equivalent to the amount of such a compound engendering sulfurous acid that is employed.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1,000 parts of the monomeric mixture to about 4 or 5 parts of catalyst per 100 parts of the mixture of monomers. The amount of polymerization adjuvat or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e. g., 2 or 3 or more moles of activator per mole of catalyst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e. g., high-energy electrons), X-rays and gamma radiation. Cobalt-60 is a convenient source of gamma radiation. In all of these cases polymerization may be initiated either by direct effect of radiation on the monomers or indirectly (if a solvent or other substance is present) by the action of radicals resulting from irradiation of these substances.

The polymerization (copolymerization) reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the monomers are copolymerized can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be caried out in a closed reaction vessel under pressure, or, for economical reasons, with a reflux condenser or other means provided for the recovery and re-use of the volatilized monomer or monomers if the reaction is carried out at the boiling temperature of the mass under atmosperic pressure.

The copolymers of this invention can be produced in various molecular weights as desired or as conditions may require. Thus, the fibre-forming copolymers, more particularly the fiber-forming acrylonitrile copolymers, ordinarily are within the range of about 15,000 to about 300,000 or higher as calculated from viscosity measurements using the Staudinger equation (reference: U. S. Patent No. 2,404,713). Homogeneous acrylonitrile copolymers having an average molecular weight of between about 60,000 and 90,000 and which contain at least 70%, advantageously from about 85% to about 95% of acrylonitrile (combined acrylonitrile) in the molecule, are especially suitable for use in making dyeable, oriented fibers by wet- or dry-spinning methods.

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

*Example 1*

A reaction vessel, equipped with a stirrer, reflux condenser, thermometer and gas-inlet tube is placed in a constant-temperature water bath which is maintained at 35° C. To the vessel is added a solution of 42.4 parts of acrylonitrile, 10.6 parts of N-(2-hydroxyethyl)acrylamide, 0.32 part of sulfuric acid and 800 parts of demineralized water. A rapid stream of pre-purified nitrogen is passed over the surface of the solution for 30 minutes. The nitrogen flow is then reduced to about 2 or 3 bubbles per second. A reduction-oxidation catalyst system ("redox" system) is prepared by dissolving 1.71 parts of ammonium persulfate and 0.71 part of sodium metabisulfite, each in 100 parts of water. The catalyst solutions are added portion-wise to the reaction vessel at 25- minute intervals over a period of 2½ hours. After a total reaction period of 6 hours, the nitrogen flow being maintained throughout the entire reaction, the copolymer that forms is collected on a Büchner funnel, washed with about 1,000 parts of demineralized water and dried in an oven at 70° C. for 16 hours. Forty-seven (47) parts of a dry, light-yellow copolymer of acrylonitrile and N-(2-hydroxyethyl)acrylamide is obtained.

*Example 2*

Exactly the same procedure is followed as described under Example 1 with the exception that 10.6 parts of N,N-bis(2-hydroxyethyl)acrylamide is used instead of 10.6 parts of N-(2-hydroxyethyl)acrylamide. The copolymer thereby obtained is a white, granular solid. The yield of copolymer amounts to 47.5 parts.

*Example 3*

In this example, too, exactly the same procedure is followed as described under Example 1 with the exception that 10.6 parts of N-methyl-N-(2-hydroxyethyl)acrylamide is used instead of 10.6 parts of N-(2-hydroxyethyl)acrylamide. The resulting copolymer of acrylonitrile and N-methyl-N-(2-hydroxyethyl)acrylamide is obtained in a yield amounting to 49 parts.

*Example 4*

This example illustrates the preparation of a ternary polymer containing in the polymer molecule an average of, by weight, about 6.3% of N-(2-hydroxyethyl)acrylamide units, about 2.3% of units of methyl vinylpyridine consisting mainly of 2-methyl-5-vinylpyridine units, and the remainder acrylonitrile units.

The copolymerization is effected continuously, using apparatus which includes a reaction vessel that is provided with an overflow tube located at the top of the reaction vessel. Agitation is effected primarily by circulating the contents of the reaction vessel continuously through a high-speed centrifugal pump. Additional agitation in the reaction vessel is effected by means of a motor-driven propeller. The temperature is regulated by means of a heat-exchanger located in the circulating system. The solutions of monomeric material and of catalyst, hereafter described, are fed into the reaction vessel using variable-speed pumps.

The reactor is charged with a previously prepared aqueous slurry (e. g., a 35% aqueous slurry) of an acrylonitrile polymerization product (polymer or copolymer), more particularly (and for purpose of illustration and not by way of limitation) a two-component copolymer of about 95% acrylonitrile and 5% methyl acrylate. The following solutions are then fed in at such a rate that the stated quantities are delivered each hour.

| Feed 1: | Parts |
|---|---|
| Ammonium persulfate | 24.1 |
| Sulfuric acid | 8.3 |
| Demineralized water | 1230.0 |

| Feed 2: | Parts |
|---|---|
| Methyl vinylpyridine consisting mainly of 2-methyl-5-vinylpyridine | 19.5 |
| N-(2-hydroxyethyl)acrylamide | 78.0 |
| Acrylonitrile | 875.0 |

| Feed 3: | Parts |
|---|---|
| Sodium meta-bisulfite | 2.89 |
| Demineralized water | 1250.00 |

The temperature of the slurry is maintained at 40° C., and the copolymerization reaction is stopped at the end of 6½ hours. The slurry resulting from the last 1½ hours of operation is combined with the final slurry in the reaction vessel.

The ternary polymer is isolated from the slurry by centrifuging, washed in the centrifuge with 40,000 parts of demineralized water, and dried in an oven at 70° C. for about 16 hours. A dry, white, dimethylformamide-soluble ternary polymer is obtained. Its chemical constitution is given in the first paragraph of this example.

Instead of charging an aqueous slurry containing about 35% of a previously prepared copolymer of about 95% acrylonitrile and 5% methyl acrylate to the reactor, one can use a slurry containing any other suitable concentration of the previously prepared acrylonitrile polymerization product (e. g., from 5 or 10% to 35 or 40% by weight of the slurry). One can use an aqueous slurry containing, for example, a previously prepared homopolymer of acrylonitrile, or of a copolymer (dipolymer, tripolymer, tetrapolymer, etc.) different from the aforementioned acrylonitrile-methyl acrylate copolymer, thereby to obtain a blend of the acrylonitrile polymerization product contained in the previously prepared slurry and of the copolymer with which this invention is concerned. When this practice is followed, the concentration of the initially prepared acrylonitrile polymerization product in the slurry decreases as the continuous polymerization proceeds and will approach zero concentration eventually. When one desires the final product to be composed solely of the copolymer of this invention, then one charges to the reactor an aqueous slurry containing a suitable concentration of a previously prepared copolymer of the invention. The polymerization reaction advantageously is carried out at a pH not higher than 6, e. g., from 2.5 to 5.9, and preferably from 3.5 or 4 to 5.9.

The foregoing polymerization technique has numerous advantages over the prior-art practices, including the advantages of providing higher overall yields of the copolymer; better control of the reaction; the more ready production of acrylonitrile copolymers having a specific, predetermined average molecular weight (this latter being particularly important when the copolymers are to be formed or fabricated into fibers); the obtainment of a more homogeneous polymeric product (that is, one which contains minimum amounts of polymer having a molecular weight outside the lower and higher limits of molecular weight wanted in the product); as well as others. This polymerization method for producing the copolymers of this invention is, to the best of my knowledge and belief, new and novel.

*Example 5*

Twenty (20) parts of the ternary polymer of Example 4 is slurried by rapid stirring at room temperature in 80 parts of dimethylformamide. While protected by a blanket of carbon dioxide the temperature of the mixture is raised to 80° C. with slow stirring until all of the copolymer has dissolved to form a clear, viscous solution.

After deaeration and filtration the warm solution is extruded downwardly through a spinneret having 40 holes, each 70 microns in diameter, into a spinning cell, the inner wall of which is maintained at a temperature of approximately 425° C. by means of a fluid heating medium which circulates around the outer wall of the cell. A current of preheated gas at 125° C. is introduced at the bottom of the cell and passes upwardly countercurrent to the filaments which pass downwardly from the spinneret. By this means the major proportion of the dimethylformamide is evaporated from the filaments by the time the filaments have reached the bottom of the cell.

From the bottom of the cell the group of filaments or thread is led through water to remove the last of the dimethylformamide solvent, after which it is continuously dried by passing it over a pair of heated drying rolls. The dry multifilament thread is then thermoplastically stretched by conducting it through a slot which is maintained at 400° C. and thence to stretch rolls. Stretch is applied to the thread by having the surface speed of the rolls on the delivery end of the heated slot about 8½ times that of the surface speed of the rolls which feed the thread to the slot. The filaments are oriented along the fiber axis by this stretching operation.

The thermoplastically stretched thread is more lustrous than that of the unstretched thread. To remove residual strains or shrinkage, the thread is conducted through a second, heated slot at 400° C. and thence to a pair of rolls, the surface speed of which is adjusted to permit about 15% shrinkage of the thread in the slot. After this termoplastic treatment the thread is collected on a ring-twister bobbin.

The finished thread is tested for its dyeability, in comparison with threads similarly prepared from homopolymeric acrylonitrile, as follows:

Swatches (10 parts) of each of the dry fibers are added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the swatches are removed, and washed with hot water until the water is free of dye. The swatch of homopolymeric acrylonitrile fibers fails to absorb any dye whereas the swatch of fibers of this example is dyed a deep blue.

*Example 6*

This example illustrates the preparation of a ternary polymer containing in the polymer molecule an average of, by weight, about 4% of methyl acrylate units, about 5% of units of N,N-bis (2-hydroxyethyl)acrylamide units, and the remainder acrylonitrile units.

The same apparatus and general procedure are employed as in Example 4. The reactor is charged with an aqueous slurry composed of 420 parts of homopolymeric acrylonitrile and 1,180 parts of demineralized water having dissolved therein 2.67 parts of sulfuric acid. The system is purged with nitrogen as in Example 4. The following solutions are then fed in at such a rate that the stated quantities are delivered each hour:

Feed 1:

| | Parts |
|---|---|
| Acrylonitrile | 194.4 |
| Methyl acrylate | 10.8 |
| N,N-bis(2-hydroxyethyl)acrylamide | 10.8 |
| tert.-Dodecyl mercaptan | 0.3 |

Feed 2:

| | Parts |
|---|---|
| Sodium chlorate | 0.85 |
| Sodium sulfite | 2.98 |
| Demineralized water | 290.00 |

Feed 3:

| | Parts |
|---|---|
| Sulfuric acid | 1.4 |
| Demineralized water | 290.0 |

The temperature of the slurry is maintained at 45° C., and the copolymerization reaction is stopped at the end of 5 hours. The ternary polymer is isolated from the reactor slurry by collection on a Büchner funnel, washed with demineralized water, and dried in an oven at 70° C. for about 16 hours. A dry, white, dimethylformamide-soluble ternary polymer is obtained. Its chemical constitution is given in the first paragraph of this example.

*Example 7*

| | Parts |
|---|---|
| N-(2-hydroxyethyl)acrylamide | 20 |
| n-Butyl acrylate | 40 |
| Styrene | 40 |
| Monomethyl ether of ethylene glycol | 200 |
| Cumene hydroperoxide | 1 |

A mixture of the above ingredients is heated under reflux at the boiling temperature of the mass for 6 hours, yielding a viscous syrup containing a ternary polymer of N-(2-hydroxyethyl)acrylamide, butyl acrylate and styrene. A sample of the viscous solution is cast on a glass or metal plate and then baked in an oven for 30 minutes at 125° C. The baked film thereby obtained is clear and fairly hard.

Instead of the above mixture of n-butyl acrylate and styrene, one can use 80 parts of n-butyl acrylate (or any of the isomeric butyl acrylates) or 80 parts of styrene.

*Example 8*

Same as in Example 7 with the exception that 20 parts of N,N-bis(2-hydroxyethyl)acrylamide is employed instead of 20 parts of N-(2-hydroxyethyl)acrylamide. Similar results are obtained.

*Example 9*

The syrupy product of Example 7 and a similar syrup from which the substituted acrylamide has been omitted in the preparation of the copolymer are each blended with a butylated melamine-formaldehyde resin dissolved in a butanol-xylene solvent mixture in the ratio of 4 parts of copolymer solids to 1 part of resin solids. To each of the solutions is added 0.05% of 85% phosphoric acid based on the solids content of the viscous solution, after which each solution is refluxed for 30 minutes. Thereafter films of each solution are cast on glass, air-dried and baked for 30 minutes at 130° C. The baked film containing no acrylamide is cloudy and is attacked severely by xylene. In marked contrast the film containing the N,N-bis(2-hydroxyethyl)acrylamide is clear and resistant to attack by xylene. The incorporation of the butylated melamine-formaldehyde resin into the composition greatly increases the hardness of baked films thereof.

The product of Example 8 gives similar results to those just described with reference to the product of Example 7.

It is believed that the improved compatibility with an aminoplast resin, of which a butylated melamine-formaldehyde resin is a typical example, is the result of chemical combination which occurs through the primary hydroxy groups of the ternary polymer and the aminoplast resin.

*Example 10*

| | Parts |
|---|---|
| N-methyl-N-(2-hydroxyethyl)acrylamide | 20 |
| Styrene | 70 |
| n-Amyl acrylate | 10 |
| Monomethyl ether of ethylene glycol | 200 |
| Cumene hydroperoxide | 1 |

Exactly the same procedure is followed as described under Example 7. The resulting syrupy solution of the ternary polymer has properties similar to those of the corresponding solution of Example 7, and is useful in the same or similar applications, for instance as described under Example 9.

Instead of n-amyl acrylate in the above formulation one can use any of the isomeric amyl acrylates (or a mixture of any or all of them in any proportions) or any of the other lower alkyl acrylates, e. g., methyl, ethyl, propyl, isopropyl, n-butyl, isobutyl, sec.-butyl or tert.-butyl acrylates, or mixtures thereof in any proportions, or mixtures of such lower alkyl acrylates with any of the amyl acrylates in any proportions.

It will be understood, of course, by those skilled in the art that my invention is not limited to the specific ingredients named in the above illustrative examples nor to the particular proportions and methods of copolymerization mentioned therein. Thus, other modifying comonomers, in addition to the methyl vinylpyridine named in Example 4 can be used. Illustrative examples of such comonomers are vinyl compounds which are different from acrylonitrile (vinyl cyanide), styrene and lower alkyl acrylates, including the different aromatic and isopropenyl aromatic compounds, more particularly the different vinyl aromatic and isopropenyl aromatic hydrocarbons (e. g., the various dialkyl styrenes, isopropenyl toluene, etc.), other different aliphatic compounds containing a $CH_2=C<$ grouping, e. g., the different substituted acrylonitriles (e. g., methacrylonitrile, ethacrylonitrile, phenyl acrylonitrile, etc.), acrylamide and the different substituted acrylamides (e. g., methacrylamide, ethacrylamide, the different N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alk-acrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., acrylic and methacrylic acids, the different esters of an acrylic acid (including acrylic acid itself and the various alpha-substituted acrylic acids, e. g., methacrylic acid, ethacrylic acid, phenylacrylic acid, etc.), more particularly the higher alkyl esters of acrylic acid, e. g., hexyl, heptyl, octyl, decyl, dodecyl, etc., esters of acrylic acid, the alkyl esters of methacrylic, ethacrylic, phenylacrylic, etc., acids, especially those containing not more than five or six carbon atoms in the alkyl grouping, and other different compounds containing a $CH_2=C<$ grouping, more particularly a single $CH_2=C<$ grouping.

The proportions of any modifying comonomer or comonomers that are incorporated in the polymerizable composition together with the N-hydroxyethyl acrylamide and acrylonitrile or other comonomer can be varied considerably. Ordinarily, however, especially in the case of acrylonitrile copolymer compositions, the acrylonitrile constitutes a major or preponderant proportion (more than 50%) by weight of monomers to be copolymerized, the N-hydroxyethyl acrylamide constitutes from about 5% to about 40% of the total weight of the acrylonitrile and the N-hydroxyethyl acrylamide, and any modifying comonomer or comonomers (if present in the polymerizable mixture) constitute the remainder of the total amount of comonomers which are subjected to copolymerization. In the preferred, fiber-forming, acrylonitrile copolymer compositions (more particularly thermoplastic acrylonitrile copolymer compositions) of the present invention, the acrylonitrile is employed in the mixture of comonomers in an amount such that at least 80% by weight of combined acrylonitrile is present in the copolymer.

Although many of the new copolymers, more particularly the acrylonitrile copolymers, of this invention are particularly useful in the formation of fibers or filaments having improved properties over that provided by homopolymeric acrylonitrile, both they and other copolymers of the present invention also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock, or textile materials; in coating compositions; and for various other purposes. The copolymer can be formed in situ after application of the monomeric mixture to the base material to be coated, impregnated or otherwise treated. The water-soluble and/or organic solvent-soluble copolymers of this invention also can be used in similar applications, as well as in others, for instance: as modifiers, more particularly plasticizers, of aminoplast, phenoplast and other synthetic resins; as components of soil-conditioning, soil stabilization and grouting compositions; as chemical intermediates for producing other compositions, e. g., ethylene oxide could be reacted therewith to form a new class of materials having utility, for instance, as surface-active agents; and for many other purposes that will be apparent to those skilled in the art from the foregoing description.

Fibers can be produced from the acrylonitrile copolymers of the present invention in the manner described in, for example, Cresswell Patents 2,558,730 and 2,558,731 and Cresswell and Wizon Patent 2,558,733.

I claim:

1. A product comprising a copolymer obtained by polymerization of a mixture of copolymerizable ingredients including (1) an N-substituted acrylamide represented by the general formula

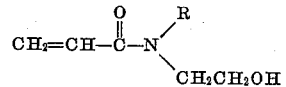

where R represents a member of the class consisting of hydrogen, the methyl radical and the radical

—$CH_2CH_2OH$ and (2) at least one monomer of the class consisting of styrene, acrylonitrile and alkyl acrylates containing from one to five carbon atoms, inclusive, in the alkyl grouping thereof, the N-substituted acrylamide of (1) constituting from about 5% to about 40% by weight of the total amount of (1) and (2).

2. A product as in claim 1 wherein the N-substituted acrylamide of (1) is N-(2-hydroxyethyl)acrylamide.

3. A product as in claim 1 wherein the N-substituted acrylamide of (1) is N,N-bis(2-hydroxyethyl)acrylamide.

4. A product as in claim 1 wherein the N-substituted acrylamide of (1) is N-methyl-N-(2-hydroxyethyl)-acrylamide.

5. A product comprising a copolymer obtained by polymerization of a mixture of copolymerizable ingredients including (1) N-(2-hydroxyethyl)acrylamide and (2) acrylonitrile, the compound of (1) constituting from about 5% to about 40% by weight of the total amount of (1) and (2).

6. A product comprising a copolymer obtained by polymerization of a mixture of copolymerizable ingredients including (1) N,N-bis(2-hydroxyethyl)acrylamide and (2) acrylonitrile, the compound of (1) constituting from about 5% to about 40% by weight of the total amount of (1) and (2).

7. A product comprising a copolymer obtained by polymerization of a mixture of copolymerizable ingredients including (1) N-(2-hydroxyethyl)acrylamide and (2) a mixture of styrene and butyl acrylate, the compound of (1) constituting from about 5% to about 40% by weight of the total amount of (1) and (2).

8. A product comprising a copolymer obtained by polymerization of a mixture of copolymerizable ingredients including (1) N,N-bis(2-hydroxyethyl)acrylamide and (2) a mixture of styrene and butyl acrylate, the compound of (1) constituting from about 5% to about 40% by weight of the total amount of (1) and (2).

9. A product comprising an oriented fiber comprised of a copolymer obtained by polymerization of a mixture of copolymerizable ingredients including (1) an N-substituted acrylamide represented by the general formula

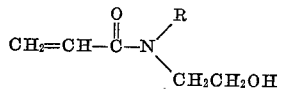

where R represents a member of the class consisting of hydrogen, the methyl radical and the radical

—$CH_2CH_2OH$ and (2) acrylonitrile, the compound of (1) constituting from about 5% to about 30% by weight of the total amount of (1) and (2).

10. A product comprising an oriented fiber comprised of a ternary polymer obtained by polymerization of a mixture of copolymerizable ingredients including (1)

N-(2-hydroxyethyl)acrylamide, (2) acrylonitrile and (3) methyl vinylpyridine consisting mainly of 2-methyl-5-vinylpyridine, the compound of (1) constituting from about 5% to about 30% by weight of the total amount of (1) and (2), the acrylonitrile of (2) constituting a major proportion by weight of the mixture of copolymerizable monomers of (1), (2) and (3) and the amount thereof being such that at least 80% by weight of combined acrylonitrile is present in the ternary polymer, and the methyl vinylpyridine of (3) constituting the remainder of the aforesaid mixture of copolymerizable monomers.

11. A product comprising an oriented fiber comprised of a ternary polymer obtained by polymerization of a mixture of copolymerizable ingredients including (1) N,N-bis-(2-hydroxyethyl)acrylamide, (2) acrylonitrile and (3) methyl vinylpyridine consisting mainly of 2-methyl-5-vinylpyridine, the compound of (1) constituting from about 5% to about 30% by weight of the total amount of (1) and (2), the acrylonitrile of (2) constituting a major proportion by weight of the mixture of copolymerizable monomers of (1), (2) and (3) and the amount thereof being such that at least 80% by weight of combined acrylonitrile is present in the ternary polymer, and the methyl vinylpyridine of (3) constituting the remainder of the aforesaid mixture of copolymerizable monomers.

No references cited.